United States Patent [19]
Ciriscioli et al.

[11] Patent Number: 4,858,966
[45] Date of Patent: Aug. 22, 1989

[54] INTRODUCTORY PORTION

[75] Inventors: Peter R. Ciriscioli, Stanford, Calif.; Michael W. Cook, Sandy, Utah

[73] Assignee: L.C.P., Inc., Reno, Nev.

[21] Appl. No.: 155,569

[22] Filed: Feb. 12, 1988

[51] Int. Cl.⁴ ............................................. F16L 41/00
[52] U.S. Cl. ..................................... 285/200; 285/401
[58] Field of Search ............... 285/200, 209, 208, 210, 285/360, 401

[56] References Cited

U.S. PATENT DOCUMENTS

| 7,318 | 4/1850 | Brown | 285/396 |
|---|---|---|---|
| 428,076 | 5/1890 | Cochran | 285/209 |
| 735,078 | 8/1903 | Felsing et al. | 285/200 X |
| 1,485,526 | 3/1924 | Pulverman | 285/200 X |
| 4,732,415 | 3/1988 | Matin et al. | 285/360 X |

FOREIGN PATENT DOCUMENTS

| 517830 | 10/1955 | Canada | 285/200 |
|---|---|---|---|
| 480172 | 6/1916 | France | 285/200 |

Primary Examiner—Thomas F. Callaghan
Attorney, Agent, or Firm—Lothrop & West

[57] ABSTRACT

A fitting for conducting fluid into or out of a pliant bag has inner and outer blocks releasably fastened together in immediate contact with the bag wall between them and with a perforate portion of the bag wall between them. Communicating flow passages in both blocks respectively are open into the bag through the perforate portion and to the fluid pressure or evacuating device.

1 Claim, 2 Drawing Sheets

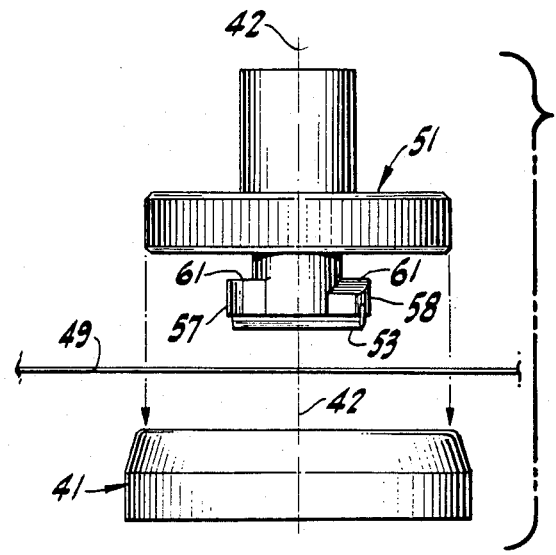
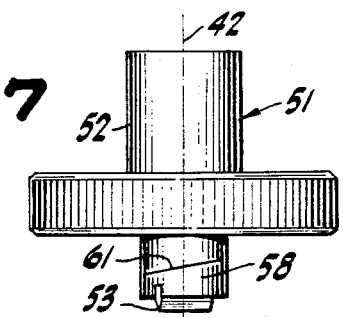
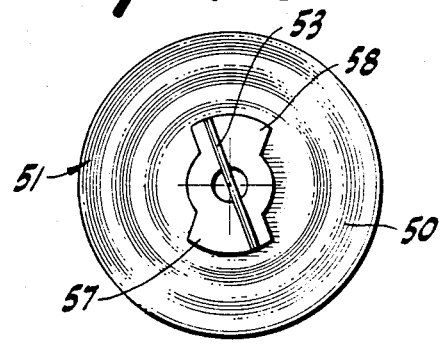
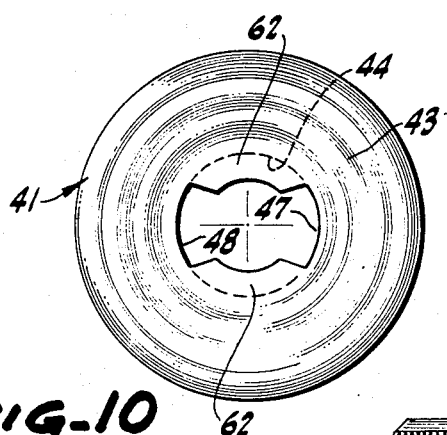
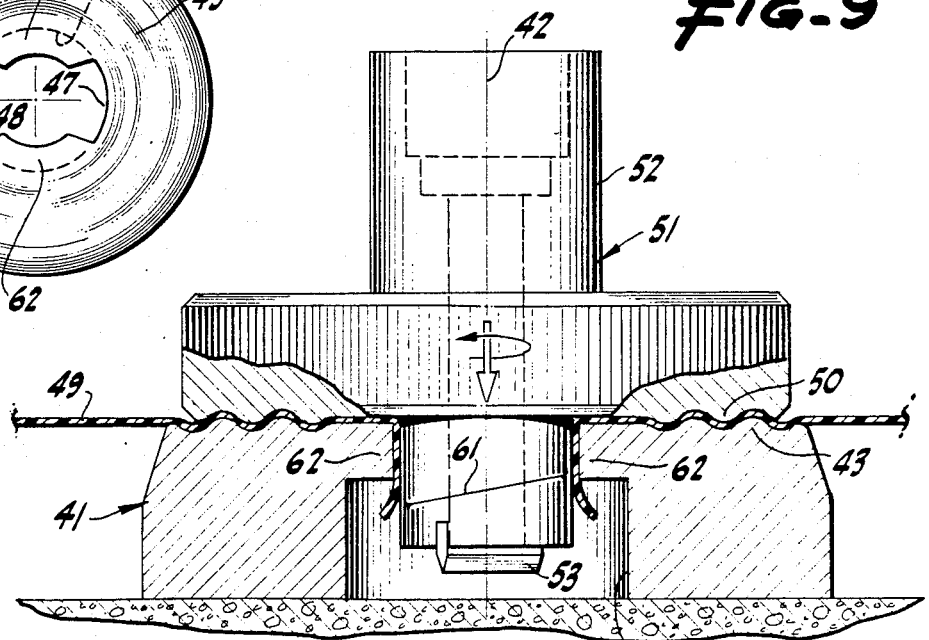
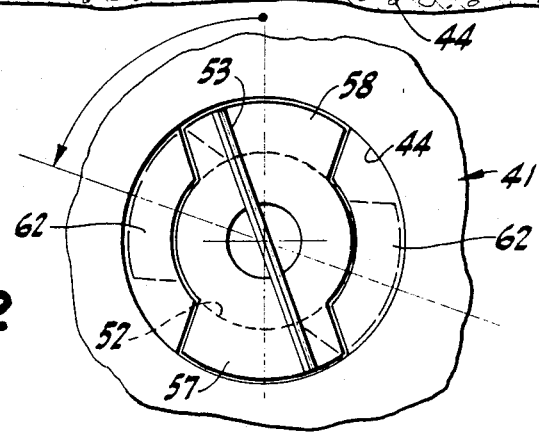

INTRODUCTORY PORTION

BACKGROUND OF THE INVENTION

1. Field Of The Invention

The invention relates to fittings for use in inflating or evacuating down a flexible container.

2. Description Of The Related Art

The applicants know of no art sufficiently related hereto to come within the scope of the claims herein.

SUMMARY OF THE INVENTION

Inner and outer blocks are releasably connected together, pressing directly on opposite sides of a bag wall. Flow passages in the blocks are in communication with each other through an opening in the bag wall. One flow passage opens into the bag interior, and the other flow passage is connected to a pressure source or to a vacuum source.

BRIEF DESCRIPTION OF THE DRAWINGS

FIG. 7 is a view of modified form of the invention, the view being in side elevation with the parts in exploded locations.

FIG. 8 is a side elevation of the upper element shown in FIG. 7.

FIG. 9 is a bottom view of the structure of FIG. 8.

FIG. 10 is a plan of the lower element in FIG. 7.

FIG. 11 is in part an enlarged side elevation of the structure of FIGS. 7-10 assembled and with a portion of the showing in cross-section on a transverse axial plane.

FIG. 12 is a view from below of part of the structure of FIG. 11.

DESCRIPTION OF THE PREFERRED EMBODIMENTS

Figure 1:
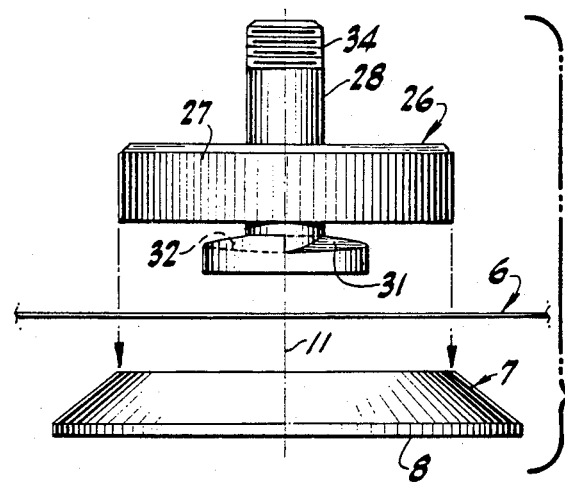
FIG. 1 is a side elevation of portions of a fitting pursuant to the invention, the parts being in exploded position.
Figure 2:
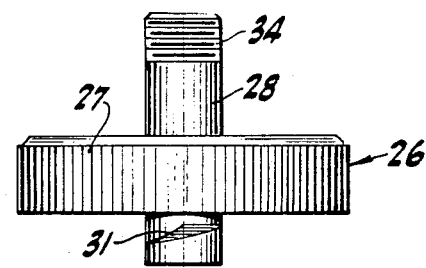
FIG. 2 is a side elevation in a different rotated position of the upper part of the structure of FIG. 1.
Figure 3:
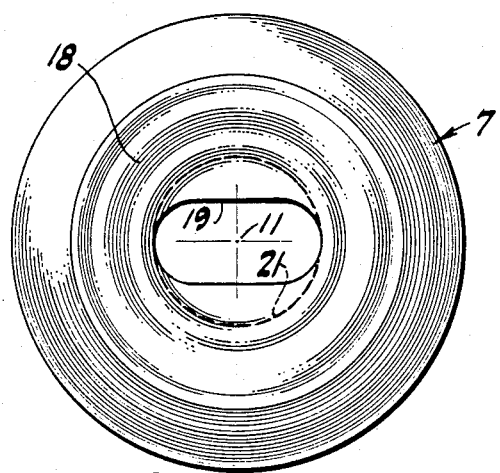
FIG. 3 is a plan view of the bottom element of the structure shown in FIG. 1.
Figure 4:
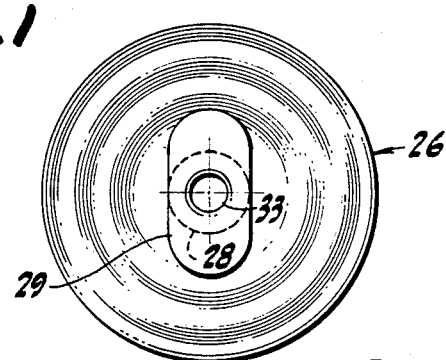
FIG. 4 is a bottom plan view of the structure shown in FIG. 2.
Figure 5:
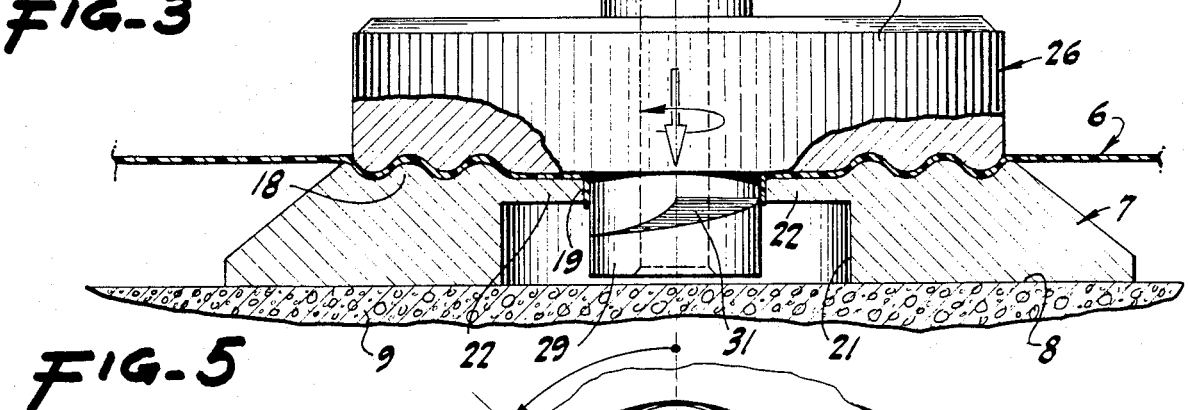
FIG. 5 is, in part, a side elevation to an enlarged scale of a fitting of the invention, another part of the view being in cross-section on an axial, transverse plane, the structure being shown, assembled and in use.
Figure 6:
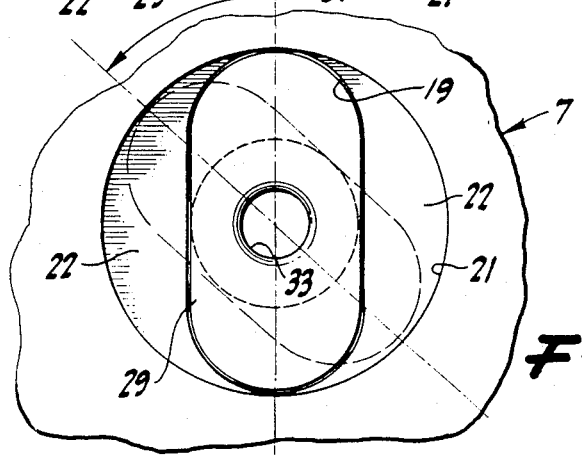
FIG. 6 is a view from below of a part of the structure of FIG. 5.

In the fabrication of some parts for space vehicles, for example, it is customary to exert pressure or force on the parts over a substantial area by utilizing a flexible bag made of thin, pliant material, such as sheet plastic. The bag is inflated (or in some cases evacuated) to provide the desired force. Such generally closed bags are customarily provided with some opening for access to the interior. The opening is readily sealed so that the bags, after pressure conditioning, are air-tight for use.

In this instance, there is provided such a bag 6 (the pressure or vacuum access portion not being shown, but being considered sealed for most of the purposes herein). The bag 6 is supplied at each of one or more various inside locations with an inner base 7 or block having a bottom, generally planar face 8 resting on a separately supplied supporting block 9 of air-permeable or spongy material. Air can flow through the block 9.

The inner base 7 is conveniently circular about a central axis 11, and while its bottom is approximately planar, its top is preferably provided with concentric undulations or corrugations 18. These surround a central recess 19 of a generally elliptical or oval configuration centered on or symmetrical about the axis 11. The recess 19 communicates inwardly through the top of the block base 7 by means of a circular opening 21 through the lower base 7 to leave side or crescent flanges 22 largely surrounding or defining the recess 19.

To cooperate with the base block 7 thee is afforded an outer block 26 of generally circular configuration symmetrical about the axis 11 and having a peripheral roughness 27 for easy hand-gripping. The outer block 26 has a central, tubular stem 28 extending upwardly along the axis 11 and also extending downwardly. At its bottom the stem 28 flares or merges with a diametrically or transversely projecting cam key 29. This key 29 is approximately of the same shape in plan as the recess 19, but is smaller. The cam key 29 has a pair of helical cam surfaces 31 and 32 at the top thereof.

In use, the lower block or inner base 7 is appropriately positioned inside the bag 6. The upper or outer block 26 is then lowered along the axis 11 toward the inside block 7. Either a local perforation has previously been made through the bag 6 in the vicinity of the axis 11, or the lowering cam key 29 moving toward and in axial registry with the recess 19 acts in cooperation with the edges of the recess 19 as a cutter or deflector sufficient at least partially to shear and to deflect the wall of the bag. This lowering or approaching operation positions the parts to provide for communication between the interior of the bag 6 through the recess 19 and through the center bore 33 or passage through the tube 28. When the parts 7 and 26 are approached sufficiently to place the lowest part of the cam surfaces 31 and 32 below the lower faces of the flanges 22, they are then manually relatively rotated about the axis 11. The cam surfaces 31 and 32 interengage the flanges, and as relative rotation continues, the intervening bag wall is increasingly engaged and squeezed to preclude leakage into or out of the bag 6. Preferably, the tube 28 has threads 34 for connection to a pneumatic line (not shown) usually affording subatmospheric pressure. When this connection has been made, the subatmospheric pressure is effective in all of the contiguous bag interior, thus exhausting the bag 6 by outflow through the porous block 9, through the recess 19 and the central passage 33 of the tube 28. If pressure in the tube 28 is superatmospheric, flow is in the opposite direction into the bag.

When the customary subatmospheric cycle has been completed, the bag 6 can be brought up to atmospheric pressure by any desired means, and the upper block 26 can be manually rotated relative to the lower block 7, thereby freeing the cam surfaces 31 and 32 from the flanges 22 and permitting the parts to be relatively moved axially and so completely separated. The lower block 7 and any support block 9 can then be removed from the bag through the initial access area.

In the arrangement shown in FIGS. 7-12 inclusive, the device generally is for operation in the same environment and is used in the same way as the preceding device. In this instance, however, the base block 41 is generally circular-cylindrical about an axis 42, has a generally flat but concentrically corrugated upper surface 43, and is pierced by a central, partially circular recess 44. Under the top undulatory surface 43 of the lower block 41, the central recess 44 is extended into wedge-shaped side portions 47 and 48 (FIG. 10). In use, a portion of a continuous bag 49 is positioned over the lower block 41. Against that portion of the bag is then positioned an upper block 51 also of generally circular configuration in plan and symmetrical about the axis 42. An undulatory under face 50 of the upper block 51 cooperates with the undulatory top surface 43 of the lower block 41 to afford a concentric, circular, undulatory grip on the intervening bag 49.

The upper block has a central tube 52 extending along the axis 42 and at its upper end connected to a source (not shown) of air under positive pressure or of air below atmospheric pressure, as desired. The tube 52 is reduced in diameter and extends through the upper block 51 and is long enough to extend through an opening in the wall of the bag 49. Preferably the tube 52 extends along the axis 42 sufficiently far to enter well into the recess 44. To make sure that an appropriate opening is provided at the desired site in the bag, the tube 52 conveniently carries diametrically and entirely across its lower end a knife blade 53 narrow enough not to block the tube and effective to slit the bag 49 as the tool assembly is being made.

Along and on its lower end, the tube 52 has diametrically opposite keystone-shaped extensions 57 and 58. These are sized to interfit closely with the openings 47 and 48 and pass therethrough by axial movement. After being in closely inserted relationship with the lower block, the upper block can be manually rotated about the axis 42. The keystone portions 57 and 58 have appropriate cam incline surfaces 61 thereon that interfit with an upper wall 62 bounding the recess 44. Upon proper rotation, the inclined surfaces cam the parts closely into position.

The bag is then inflated or deflated, as desired. At the end of the operation, the pressure within the bag is returned substantially to atmospheric pressure. Then the fitting parts are manually relatively rotated, the keystone portions are so disengaged, and the upper block is moved axially away from the lower block. All interior parts can be recovered, at the end of the operation, from the access portion of the bag, as before.

With these arrangements, washers and packings are omitted. The number of leakage paths is reduced by omitting washers and the like and by using the blocks to deform and slightly stretch the bag material in the plane of the bag wall and to form undulations for longer, non-linear abutting surfaces.

We claim:

1. A fitting for filling or evacuating a bag having a flexible wall with an inner face and an outer face and having means defining a hole in said wall comprising an inner block symmetrical about an axis and adapted to abut said inner face and having a transversely elongated recess in said inner block extending only partway through said inner block to leave side flanges, said inner block having an upper surface extending substantially normal to said axis with coaxial annular corrugations therein; an outer block symmetrical about said axis and having a lower surface substantially normal to said axis with coaxial annular corrugations thereon positioned to intersperse with said annular corrugations of said inner block; a stem on and extending axially above and below said outer block; means defining an axial passage through said stem adapted to connect with a pressure source and to connect with said recess in said block; crescent flanges on said inner block extending into said axial passage; means on said stem projecting radially therefrom and adapted to rotate with said stem about said axis between one rotated position in which said projecting means engage said adjacent flanges and preclude relative axial movement of said inner block and said outer block and another rotated position in which said projections are axially movable between said crescent flanges; and an air permeable supporting block underlying and disposed against said lower surface of said inner block and spanning said recess out of contact with said stem.

* * * * *